Patented Mar. 25, 1924.

1,488,311

UNITED STATES PATENT OFFICE.

CLARENCE J. BROCKBANK, OF PHILADELPHIA, PENNSYLVANIA, ASSIGNOR TO ABRASIVE COMPANY, OF PHILADELPHIA, PENNSYLVANIA, A CORPORATION OF PENNSYLVANIA.

METHOD OF PURIFYING SILICON-CARBIDE CRYSTALS.

No Drawing.   Application filed October 21, 1920.   Serial No. 418,379.

*To all whom it may concern:*

Be it known that I, CLARENCE J. BROCKBANK, a subject of the King of Great Britain, residing in Philadelphia, county of Philadelphia, Pennsylvania, have invented certain Improvements in Methods of Purifying Silicon-Carbide Crystals, of which the following is a specification.

The object of my invention is to provide an improved process for eliminating the surface impurities of silicon carbide crystals for use in the manufacture of refractory articles whereby a generally improved and more efficient article is obtained.

Crude silicon carbide as produced at present in an electric furnace consists of a crystal aggregate, each individual crystal of which is coated with impurities which are present in the gaseous atmosphere of the furnace, or which are formed during the reaction between the carbon and the coke and from the impurities contained therein. These surface impurities are largely metallic in nature, and may consist among other things of silicon, alloys and compounds of silicon with iron, and in small amounts of both silicon and iron with calcium. Graphite also may be present, together with fused silica.

Inasmuch as silicon carbide after crushing and grading is largely used in the manufacture of grinding wheels, stones and refractory articles of one sort or another, involving the bonding of the grain with a ceramic bond at temperatures ranging from 1100° C. to 1500° C., it has been found essential to remove the impurities from the surface of the grains prior to their bonding, because of their prejudicial effect on the bonds used at their vitrification temperatures.

In the method commonly used for removal of the said impurities, the silicon carbide after crushing is treated with dilute sulfuric acid with a coincident application of heat. Where a specially pure, fine grain is desired, the material may also be treated with caustic soda solution previous to the acid treatment. Due to the fact that some of the alloys and compounds of silicon and iron strongly resist solution in both alkali and acid solutions, neither of these methods effects complete purification.

I have discovered that by treating the grains with an acid solution consisting of hydrochloric or equivalent acid and hydrofluoric acid in which a small amount of copper sulfate has been dissolved, greatly improved purifying results are obtained, the compound resulting from the solution of copper sulfate in the acid mixture effectively assisting in the solution of the metallic impurities. When for the above named acid mixture an acid, such as sulfuric, which is incapable of dissolving the contained metal of the copper sulfate, is substituted, there results a deposit of metallic copper upon the grains under treatment, the metallic copper apparently replacing the impurities. It therefore is indicated that in the treatment of the grains as described there occurs an electrolytic action which tends to substitute the contained metal of the metallic salt for the impurities of which it is desired to rid the grains, and where, as in the case of the first mentioned acid mixture, the acid is capable of dissolving the said contained metal, the latter as quickly as liberated is taken up, with the result that the grains are left clear.

In carrying out my process, I prefer to employ as constituents of my acid solution, hydrochloric acid of commercial strength, 30% hydrofluoric acid, and water, these elements constituting respectively 16%, 3% and 81% by volume of the solution. In these acids I dissolve a small amount of copper sulfate, preferably in the proportion of about 1 lb. of the sulfate to 100 lbs. of the solution, although the sulfate may be largely in excess of this amount. The grains of carbide are now treated with the solution in the usual manner, preferably with application of heat, the time of treatment required ordinarily ranging from 10 to 20 hours, according to the grade of material being treated.

It has been found that after the treatment described above, the surface iron is entirely eliminated and surface silicon reduced to an absolutely negligible trace, the following analysis being typical of silicon carbide grains treated by my process:

| Surface silicon | Surface iron |
|---|---|
| 0.02% | nil |

Sulfuric and nitric acids may be named as equivalents of the hydrochloric acid in the solution, but the use of sulfuric acid necessitates an additional step in the process, since in this case the surface impurities, although removed, are as previously described replaced by a deposit of copper upon the surfaces of the grains which must be removed by further acid treatment, while the use of nitric acid in the solution has been found impracticable owing to difficulty in obtaining a container for the carbide grains which is immune from attack by this latter acid.

It will be understood that considerable latitude is permissible in the particular amounts of the materials specified and in the time of treatment of the silicon carbide, since the elements of the process will depend largely upon the condition of the carbide grains under treatment.

I claim:

1. The method of purifying silicon carbide, which consists of treating said carbide with a solution containing hydrofluoric acid, copper sulfate and hydrochloric acid.

2. The method of removing surface impurities from silicon carbide, which consists of heating the material with a mixture of hydrochloric acid, hydrofluoric acid and copper sulfate, substantially as described.

3. The method of removing metallic or other impurities from the surface of silicon carbide crystals or grains, which comprises treating the material with an acid solution of a metallic salt capable of electrolytically replacing the said impurities with its contained metal.

4. The method of removing metallic or other impurities from the surface of silicon carbide crystals or grains, which consists of treating the material with a metallic salt having the property of electrolytically replacing the said impurities with its contained metal in an acid solution capable of dissolving the contained metal.

5. The method of purifying silicon carbide, which consists of treating said carbide with an acid solution containing hydrochloric acid, hydrofluoric acid and water, constituting approximately and respectively 16%, 3% and 81% of the solution, and copper sulfate present in the said solution in the proportion approximately of 1 part by weight of sulfate to 100 parts of solution.

6. The method for purifying silicon carbide crystals or grains that consists in treating the carbide with a solution of a metallic substance capable of replacing the impurities with its contained metal.

7. The method for purifying silicon carbide crystals or grains that consists in treating the carbide with a metallic compound capable of reacting with the impurities to replace the latter with its contained metal.

8. The method for purifying silicon carbide crystals or grains that consists in treating the carbide with a liquid solvent containing a metallic compound capable in presence of the solvent of reacting with the impurities to replace the latter with its contained metal.

9. In a method of removing metallic or other impurities from the surface of silicon carbide crystals or grains, the step which consists of treating the crystals with a solvent for said impurities in the presence of a metallic salt capable of depositing its contained metal upon the surface of said material.

10. The method of purifying silicon carbide crystals or grains which consists in treating the carbide with a liquid solvent for the impurities containing copper as an active element.

11. The method of removing metallic or other impurities from the surface of silicon carbide crystals or grains which comprises treating the material with an acid solution of copper sulfate.

CLARENCE J. BROCKBANK.